US 011190465B2

(12) United States Patent
Kumar et al.

(10) Patent No.: US 11,190,465 B2
(45) Date of Patent: Nov. 30, 2021

(54) DISPLAYING DATA SETS RESPONSIVE TO NATURAL LANGUAGE MESSAGES RECEIVED BY CHATBOTS

(71) Applicant: Oracle International Corporation, Redwood Shores, CA (US)

(72) Inventors: Ashish Kumar, Bangalore (IN); Rahul Dutta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 16/055,161

(22) Filed: Aug. 6, 2018

(65) Prior Publication Data

US 2020/0044992 A1 Feb. 6, 2020

(51) Int. Cl.
*H04L 12/58* (2006.01)
*G06F 16/338* (2019.01)
*G06F 16/332* (2019.01)

(52) U.S. Cl.
CPC ............ *H04L 51/02* (2013.01); *G06F 16/338* (2019.01); *G06F 16/3329* (2019.01); *H04L 51/046* (2013.01)

(58) Field of Classification Search
CPC ....... G10L 15/00; H04L 51/046; H04L 51/02; G06F 16/338; G06F 16/3329
USPC .......................................... 715/231; 704/235
See application file for complete search history.

(56) References Cited

U.S. PATENT DOCUMENTS

| | | | |
|---|---|---|---|
| 7,319,992 B2 | 1/2008 | Gaos | |
| 8,965,922 B2 | 2/2015 | Kandogan et al. | |
| 9,338,493 B2 | 5/2016 | Van Os et al. | |
| 9,514,748 B2 | 12/2016 | Reddy et al. | |
| 10,708,203 B2* | 7/2020 | Morris | H04L 51/046 |
| 2011/0267985 A1* | 11/2011 | Wilkinson | H04M 1/2535 370/259 |
| 2011/0289428 A1* | 11/2011 | Yuen | H04L 51/04 715/752 |

(Continued)

FOREIGN PATENT DOCUMENTS

CN 107247750 A 10/2017

OTHER PUBLICATIONS

Novel AI Bot Allows Users to Talk to and Get Answers From Their Data Viz Apps, http://aithority.com/natural-language/chatbots-intelligent-assistants/novel-ai-bot-allows-users-talk-get-answers-data-viz-apps/, downloaded circa Mar. 16, 2018, pp. 1-2.

(Continued)

*Primary Examiner* — Michael Colucci
(74) *Attorney, Agent, or Firm* — Iphorizons PLLC; Narendra Reddy Thappeta

(57) ABSTRACT

An aspect of the present disclosure facilitates processing of natural language (NL) messages. In one embodiment, upon receiving a NL message from a user directed to a chatbot operational in a digital processing system, a data set pertinent for responding to the NL message is formed. An interactive widget that facilitates examination of the formed data set in different views is constructed and sent for display as a response to the NL message. Accordingly, when the interactive widget is displayed (on a display unit), the user is facilitated to examine the data set (pertinent to the NL message) in different views by interacting with the interactive widget.

22 Claims, 12 Drawing Sheets

(56) References Cited

U.S. PATENT DOCUMENTS

| | | | |
|---|---|---|---|
| 2012/0023407 A1* | 1/2012 | Taylor | G06F 3/04842 715/731 |
| 2015/0161617 A1* | 6/2015 | Kannan | G06F 3/0482 705/304 |
| 2015/0294220 A1 | 10/2015 | Oreif | |
| 2015/0363478 A1* | 12/2015 | Haynes | G06F 16/26 707/625 |
| 2017/0063710 A1* | 3/2017 | Smith | H04L 67/10 |
| 2017/0279747 A1* | 9/2017 | Melzer | H04L 51/046 |
| 2018/0007081 A1* | 1/2018 | Friend | H04L 63/18 |
| 2018/0239837 A1* | 8/2018 | Wang | G06F 16/17 |
| 2018/0375806 A1* | 12/2018 | Manning | G06F 16/9566 |
| 2019/0138165 A1* | 5/2019 | Siddhantam | G06F 3/0482 |
| 2019/0268233 A1* | 8/2019 | Singh | G06Q 10/06393 |
| 2019/0313146 A1* | 10/2019 | Kakuschke | G06T 11/60 |

OTHER PUBLICATIONS

CrunchBot™ Leads Data Analytics Chatbot Field, https://www.crunch-data.com/blog/crunchbot-leads-data-analytics-chatbot-field/, downloaded circa Mar. 19, 2018, pp. 1-2.

ChatBots are coming . . . as interface for ERP systems, http://ywanvanloon.com/chatbots-are-coming-as-interface-for-erp-systems/, downloaded circa Mar. 19, 2018, pp. 1-3.

SIA—Sales Intelligent Assistant bot, https://acuvate.com/solutions/sia-sales-intelligent-assistant-bot/, downloaded circa Mar. 19, 2018, pp. 1-8.

* cited by examiner

DISPLAYING DATA SETS RESPONSIVE TO NATURAL LANGUAGE MESSAGES RECEIVED BY CHATBOTS

BACKGROUND OF THE DISCLOSURE

Technical Field

The present disclosure relates to chatbots, and more specifically to displaying data sets responsive to natural language messages received by chatbots.

Related Art

Chatbots are designed to conduct chat conversations with users via digital networks. A chatbot receives messages in natural language (NL) from a user and sends corresponding responses typically as though being provided by a human being. The received NL messages can be in the form of text or audio, while the responses are in the form of text, audio, image and video, as is well known in the relevant arts.

Data sets also may be provided as corresponding responses to NL messages. A data set represents a collection of data elements, potentially organized in one or more dimensions. When the data sets are complex (e.g., having large number of elements and/or dimensions), the above noted forms of responses may not be convenient for users.

Aspects of the present disclosure are related to displaying data sets responsive to natural language messages received by chatbots.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
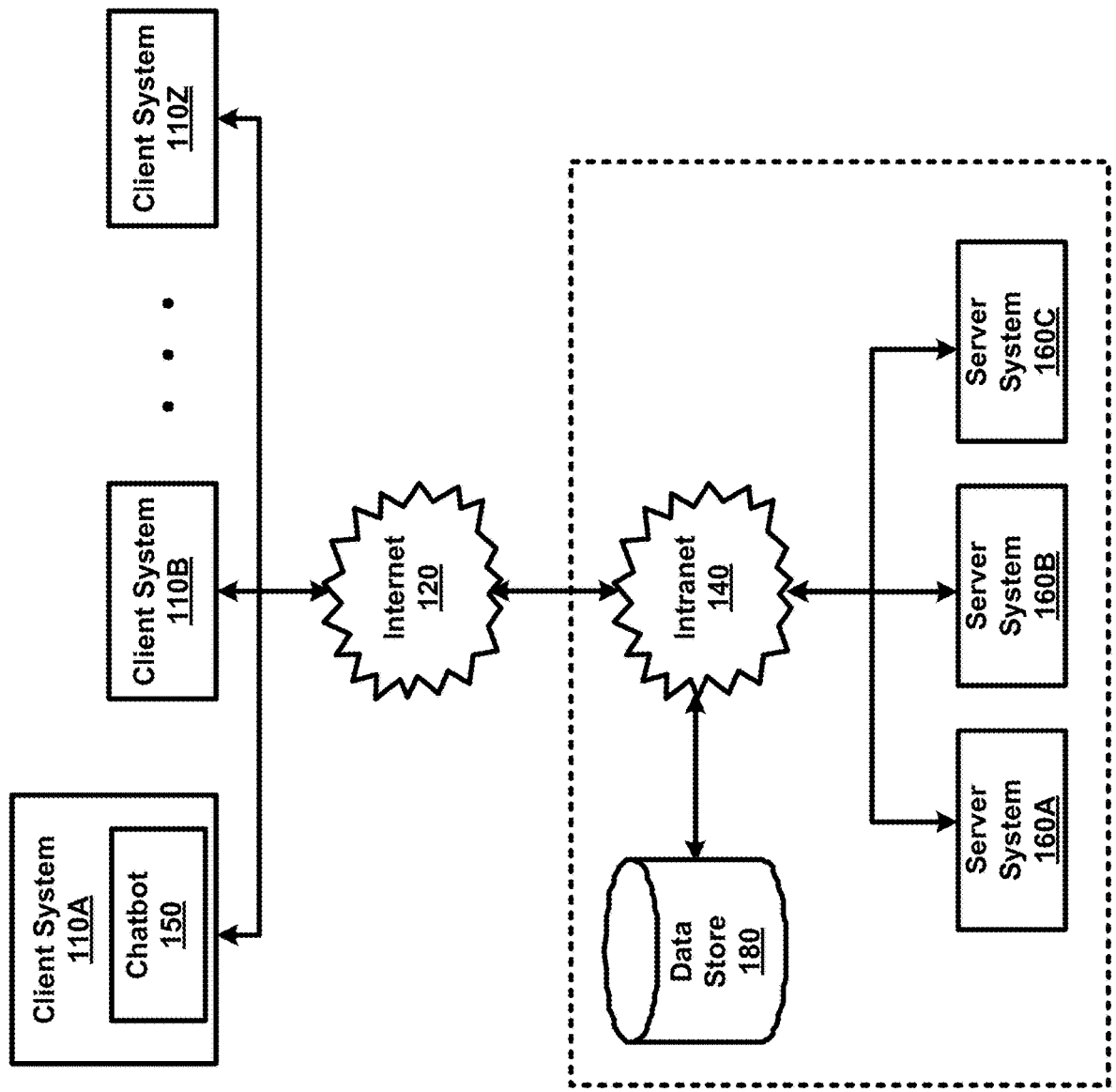
FIG. 1 is a block diagram illustrating an example environment in which several aspects of the present disclosure can be implemented.

Aspects of the present disclosure relate to processing of natural language (NL) messages directed to chatbots. In one embodiment, upon receiving a NL message from a user directed to a chatbot operational in a digital processing system, a data set pertinent for responding to the NL message is formed. An interactive widget that facilitates examination of the formed data set in different views is constructed and sent for display as a response to the NL message. Accordingly, when the interactive widget is displayed (on a display unit), the user is facilitated to examine the data set (pertinent to the NL message) in different views by interacting with the interactive widget.

In one embodiment, the NL message is received as part of a chat conversation with the user, with the interactive widget being displayed associated with the chat conversation.

According to another aspect of the present disclosure, the chat conversation is displayed in a first display area and the interactive widget is displayed in a second display area, wherein the second display area is embedded in the first display area.

According to one more aspect of the present disclosure, a user interface containing a chat pane and an interactive pane is sent for display, with the chat conversation being displayed in the chat pane and the interactive widget being displayed in the interactive pane. In one embodiment, the chat pane and the interactive pane are displayed in a display unit in non-overlapping display areas.

According to yet another aspect of the present disclosure, the interactive widget (sent as a response to the NL message) includes a set of filters, wherein the user examines the data set (pertinent to the NL message) in different views by operating one or more of the set of filters.

According to an aspect of the present disclosure, the chatbot is implemented in a client system, with the above noted receiving of the NL message, forming of the data set, constructing and sending for display of the interactive widget being performed in the client system. The forming of the data set includes retrieving the data set by communicating with a server system.

In one embodiment, the server system is an orchestration server maintaining multiple orchestration scripts, with the client system then sending an identifier of a specific orchestration script and parameter values for the specific orchestration script to the orchestration server. The orchestration server determines the data set by executing the specific orchestration script with the parameter values (received from the client system).

According to yet another aspect of the present disclosure, upon receiving another NL message from a user, another interactive widget containing a listing of the multiple orchestration scripts (maintained by orchestration server) is constructed and sent for display. Upon receiving via another interactive widget from the user, an identifier of an orchestration script and corresponding parameter values for the orchestration script, a data set retrieved by execution of the user selected orchestration script is provided via the another interactive widget.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing client systems 110A-110Z, Internet 120, intranet 140, server systems 160A-160C and data store 180.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160A-160C and data store 180, all provided within an enterprise (as indicated by the dotted boundary). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Data store 180 represents a non-volatile (persistent) storage facilitating storage and retrieval of enterprise data by applications executing in server systems 160A-160C. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

Each of client systems 110A-110Z represents a system such as a personal computer, workstation, mobile device, computing tablet etc., used by users to generate (client) requests directed to enterprise applications executing in server system 160A-160C. The client requests may be generated using appropriate user interfaces (e.g., web pages provided by an enterprise application executing in a server system, a native user interface provided by a portion of an enterprise application downloaded from server systems, etc.). In general, an client system requests an enterprise application for performing desired tasks and receives the corresponding responses (e.g., web pages) containing the results of performance of the requested tasks. The web pages/responses may then be presented to the user by the client applications such as the browser. Each client request is sent in the form of an IP packet directed to the desired server system or enterprise application, with the IP packet including data identifying the desired tasks in the payload portion.

Each of server systems 160A-160C represents a server, such as a web/application server, executing enterprise applications performing tasks requested by users using one of client systems 110A-110Z. A server system may use data stored internally (for example, in a non-volatile storage/hard disk within the server system), external data (e.g., maintained in data store 180) and/or data received from external sources (e.g., from the user) in performing the requested tasks. The server system then sends the result of performance of the tasks to the requesting client system (one of 110A-110Z). The results may be accompanied by specific user interfaces (e.g., web pages) for displaying the results to the requesting user.

Chatbot 150 represents a client application (shown executing in client system 110A for illustration) that is designed to conduct chat conversations with users using client system 110A. The chat conversations are typically conducted based on natural language (NL) messages. Though chatbot 150 is shown entirely within client system 110A, it may be appreciated that in alternative embodiment, chatbot 150 may be implemented (entirely or portions thereof) in other client systems (110B-110Z) and/or in server systems 160A-160C.

As noted in the Background section, complex data sets may be required to be provided as corresponding responses to NL messages received from the users. Chatbot 150, provided according to several aspects of the present disclosure, displays (such complex) data sets responsive to natural language messages in a user convenient manner, as described below with examples.

3. Displaying Data Sets Responsive to Natural Language Messages

Figure 2:
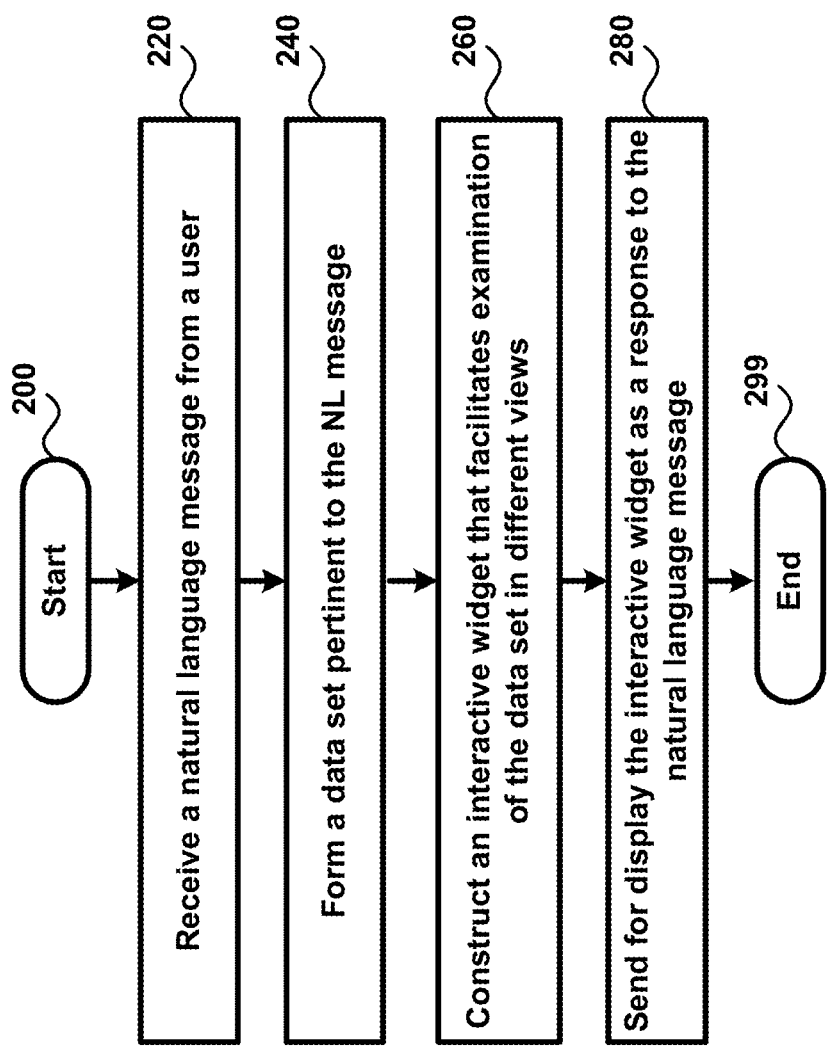
FIG. 2 is a flow chart illustrating the manner in which display of data sets responsive to natural language messages received by chatbots is facilitated according to an aspect of the present disclosure.

FIG. 2 is a flow chart illustrating the manner in which display of data sets responsive to natural language messages received by chatbots is facilitated according to an aspect of the present disclosure. The flowchart is described with respect to the systems of FIG. 1, in particular chatbot 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, chatbot 150 receives a natural language (NL) message from a user (using client system 110A). The NL message may be received as part of/during a chat conversation between the user and chatbot 150.

In step 240, chatbot 150 forms a data set pertinent to (responding to) the NL message. The pertinent data set may be identified based on the content (e.g. words, symbols, etc.) of the NL message and/or the context (e.g. the previous messages) in which the NL message was received. In one embodiment described below, a neural network mapping possible words/symbols in NL messages to corresponding pertinent data sets is created. The neural network is thereafter trained using the commonly used/recurring words/symbols received from the user. Upon receiving the NL message in step 220, the content of the message is analyzed using the pre-trained neural network and the specific data set pertinent to the NL message is identified.

Once the pertinent data set is identified, the data set is retrieved. In one embodiment, the data sets are stored in data store 180, and accordingly forming entails retrieving the pertinent data set by communicating with an application executing on one or more of server systems 160A-160C.

In step 260, chatbot 150 construct an interactive widget that facilitates examination of the data set in different views. As is well known, a widget represents a component of a user interface that enables a user to perform a function or access a service (here, examine the data set in different views). The views of the data may be different based on factors such as the view format (grid vs graph), subsets of data included in the view (e.g. based on filters applied to the data), any additional processing specified by the user (e.g. summation, average, count, etc.). The term "interactive" implies that the widget is directly (and quickly) responsive to user inputs. For example, upon a user moving a mouse pointer over a data value in the data set, additional information related to the data value may be displayed as a tool tip.

In step 280, chatbot 150 sends for display the interactive widget as a response to the natural language message (received from the user in step 220). The interactive widget may thereafter by displayed (on a display unit associated with client system 110A), thereby facilitating the user to examine the data set in different views by interacting with the interactive widget. The flowchart ends in step 299.

It may be appreciated that the providing of the interactive widget for a data set facilitates the display of complex data sets in a user convenient manner. In addition, the interactivity may be provided without requiring any additional data to be retrieved (after the construction of the widget).

The manner in which chatbot 150 displays data sets responsive to NL messages according to the operation of FIG. 2 is illustrated below with examples.

4. Sample User Interfaces

Figure 3A:
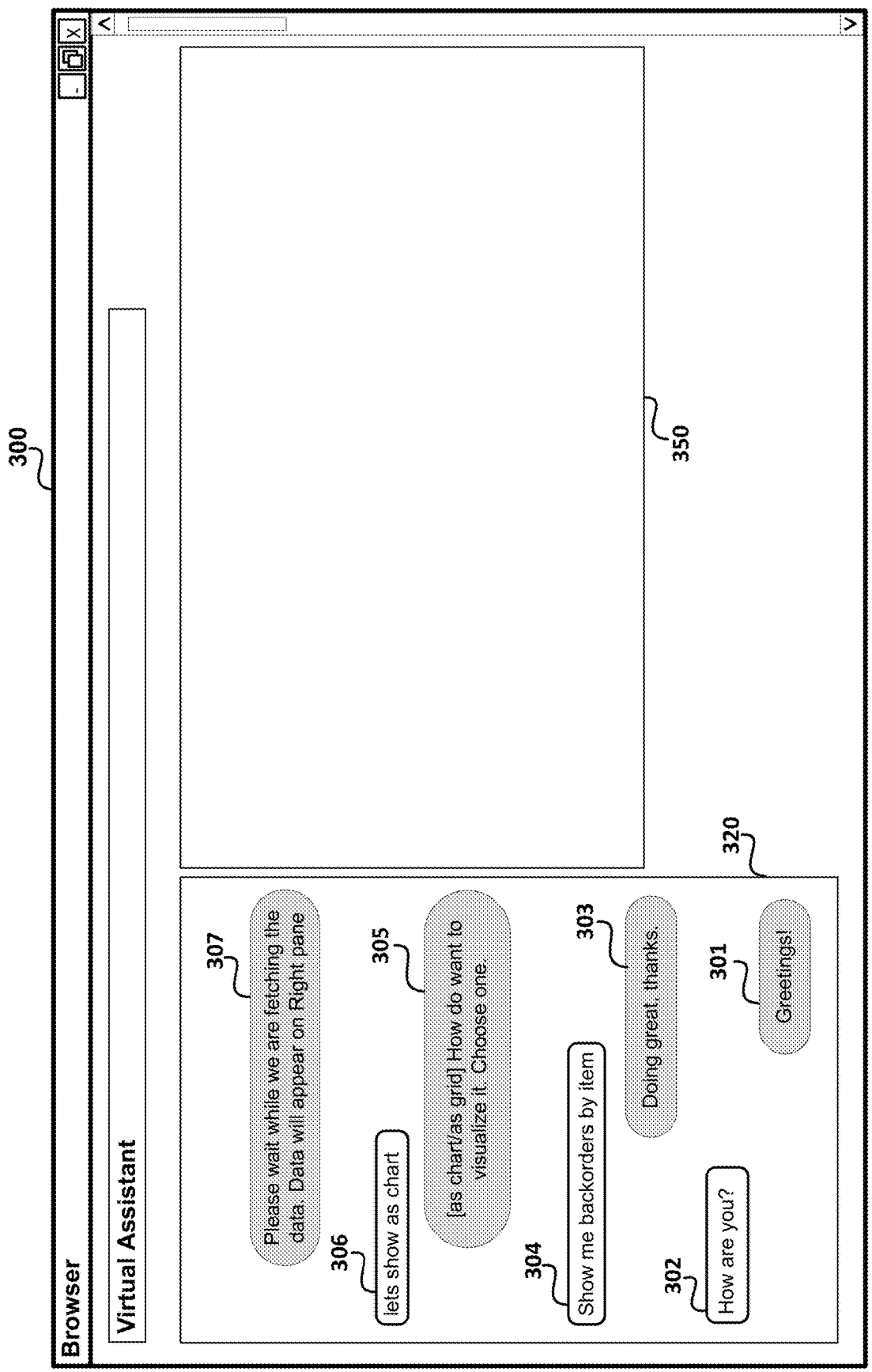
FIGS. 3A-3E depicts sample user interfaces illustrating the display of data sets responsive to natural language messages received by chatbots in one embodiment.
Figure 3B:
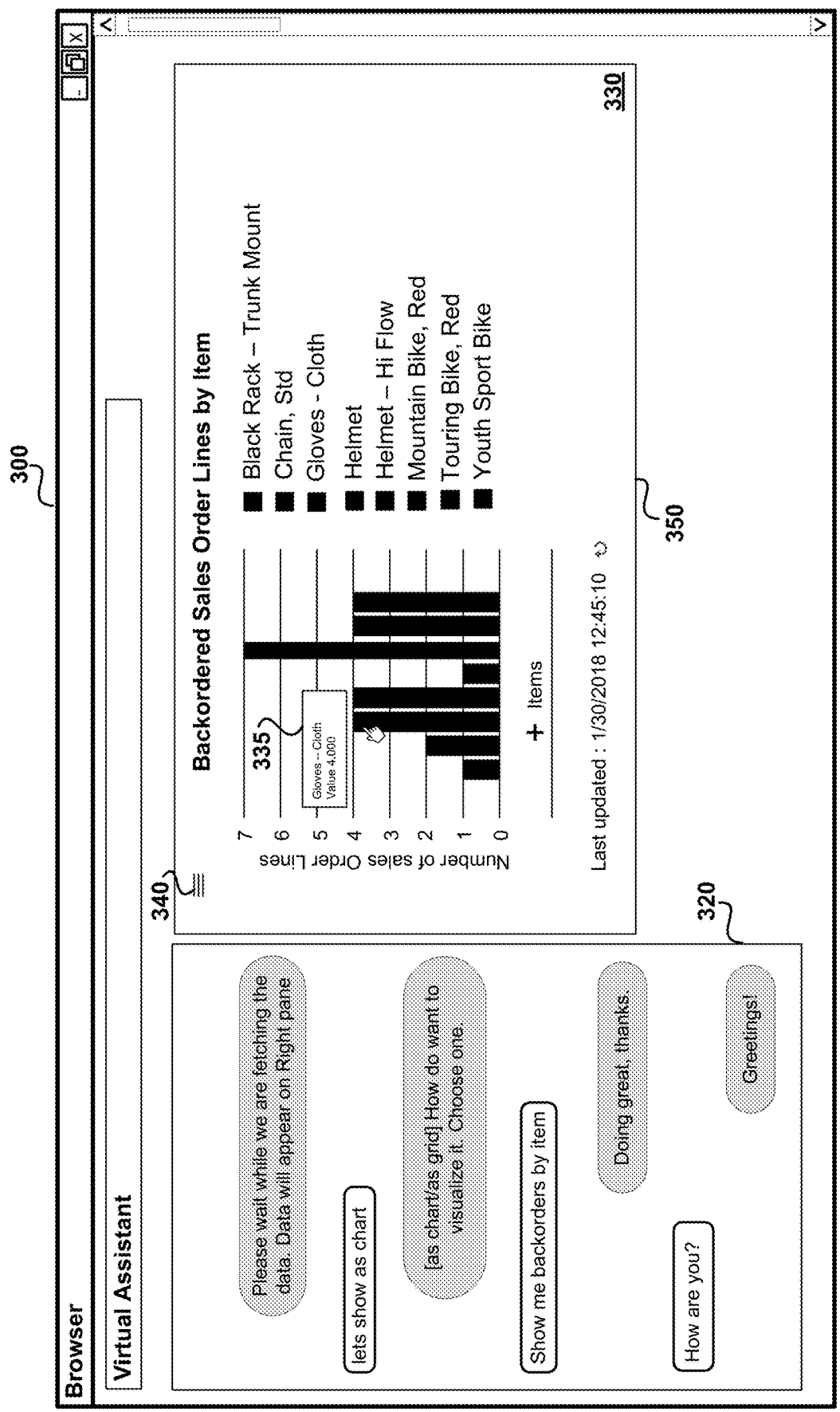
Figure 3C:
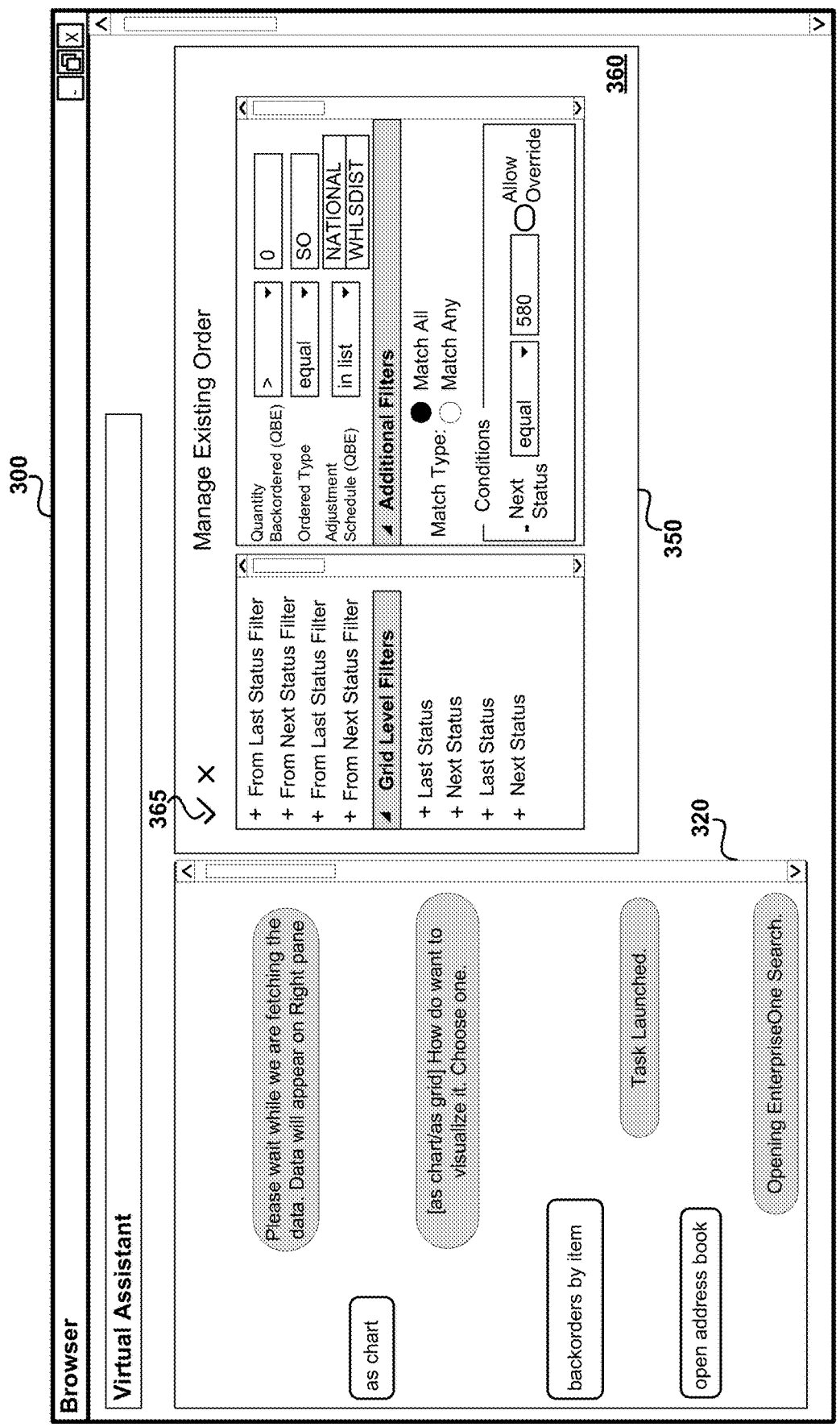
Figure 3D:
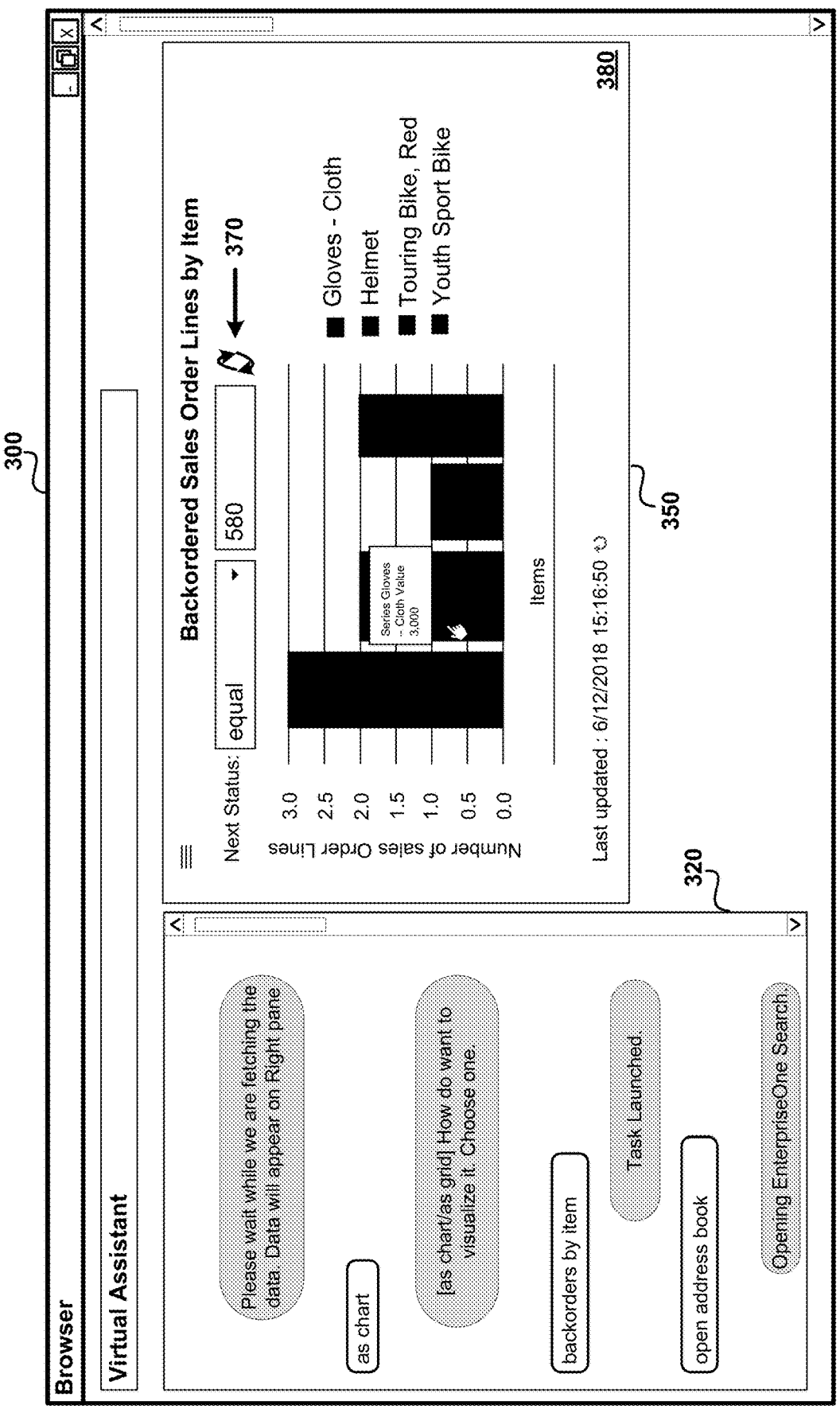
Figure 3E:
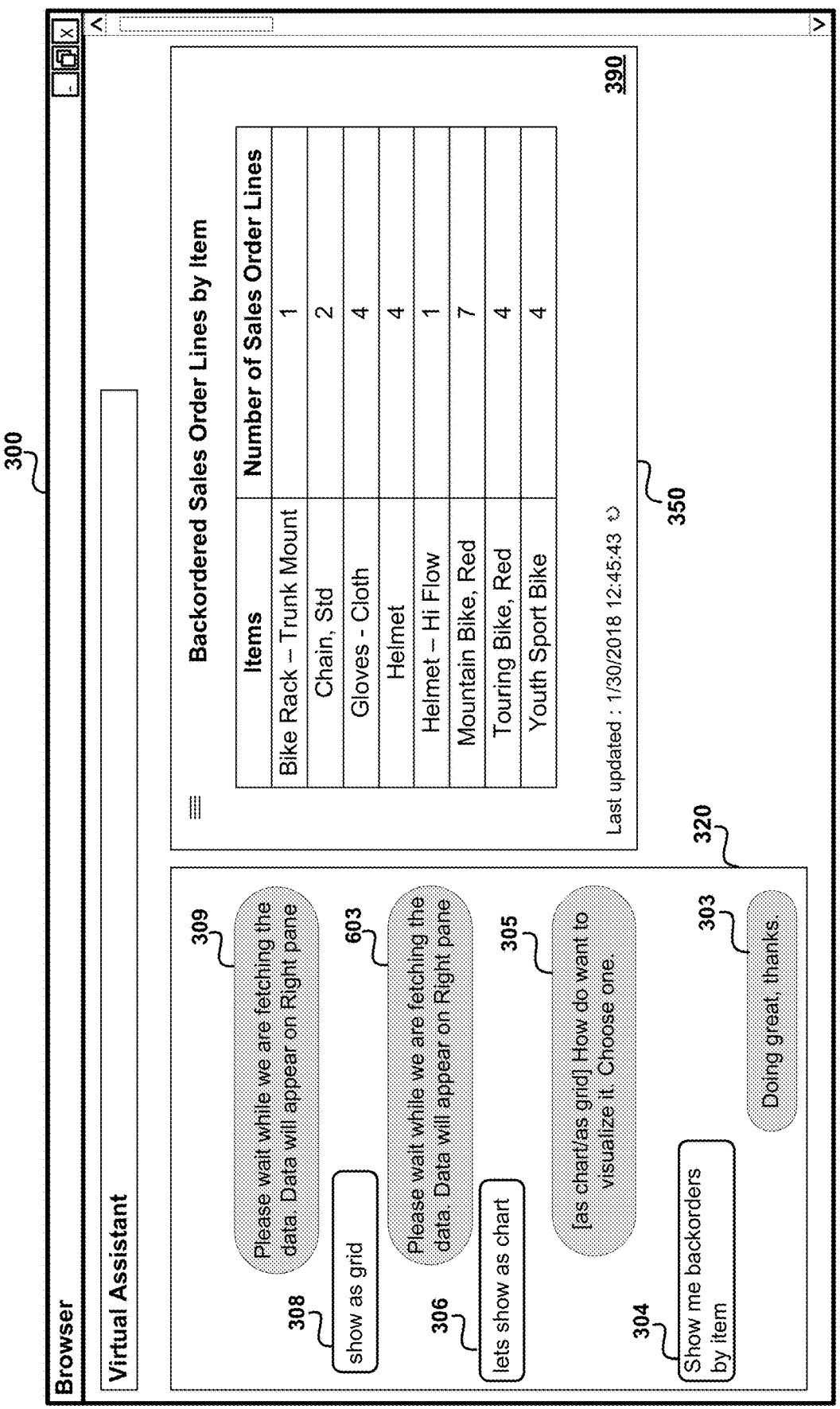
Figure 4A:
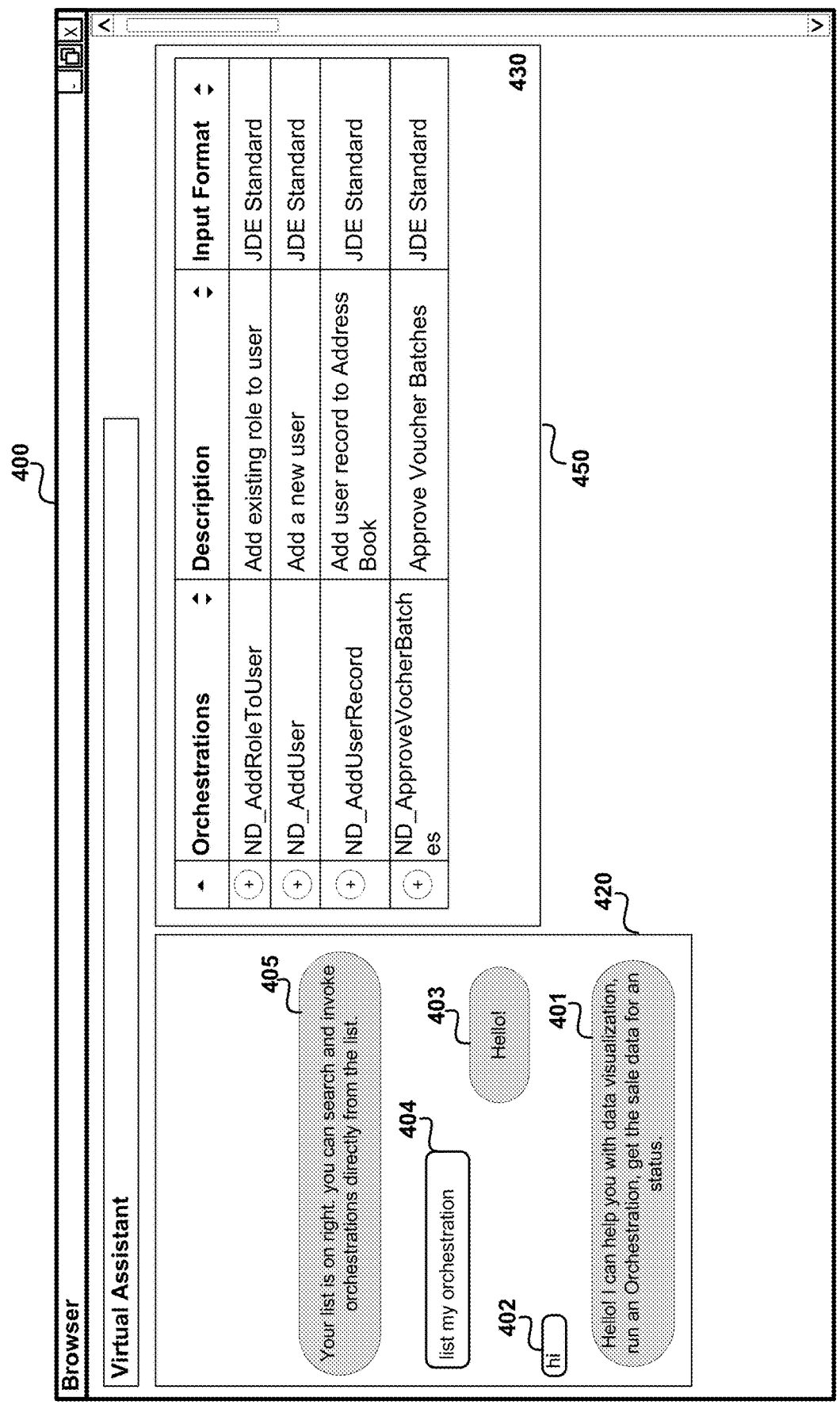
FIGS. 4A-4C depicts sample user interfaces illustrating the display of additional information responsive to natural language messages received by chatbots in one embodiment.
Figure 4B:
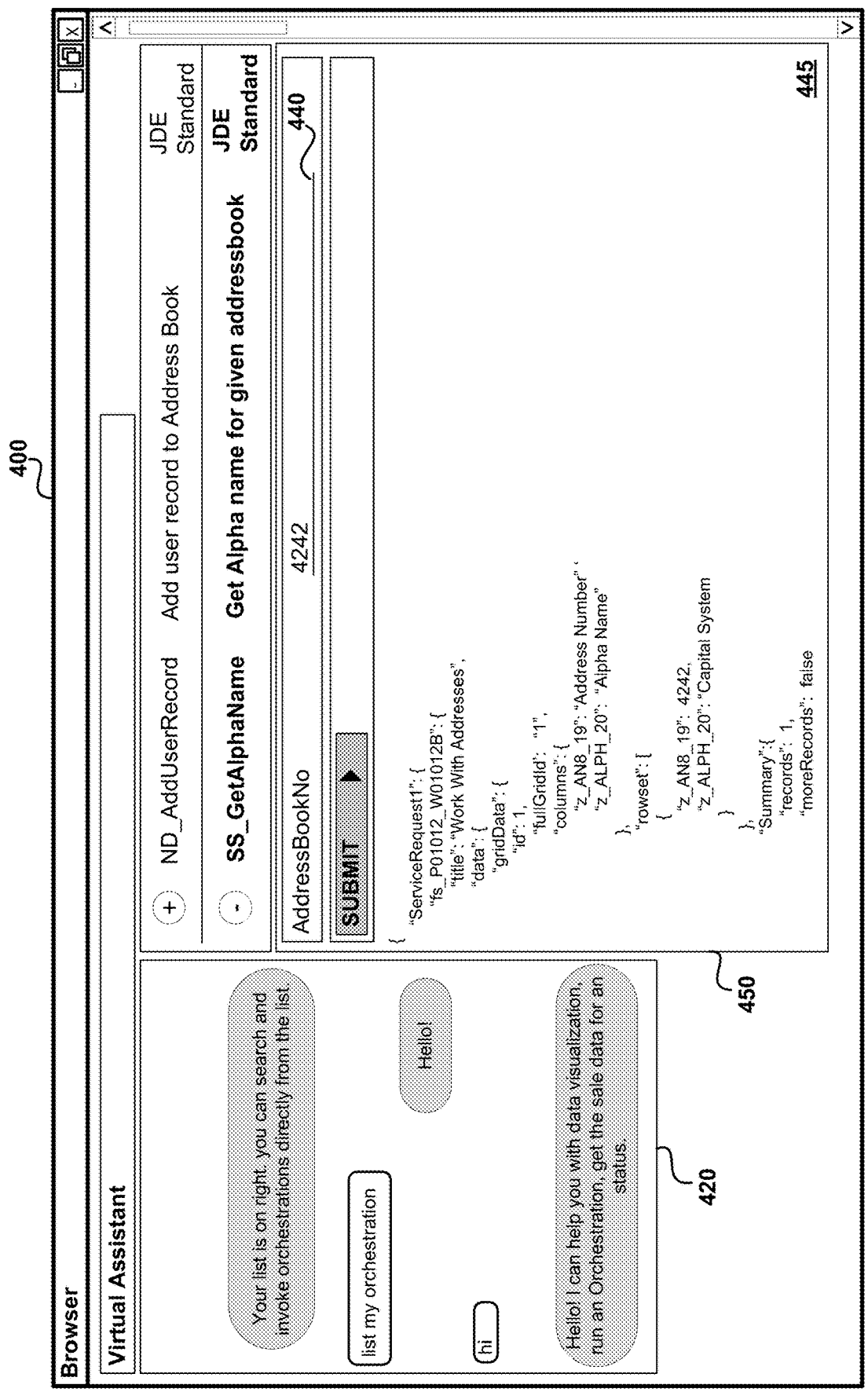
Figure 4C:
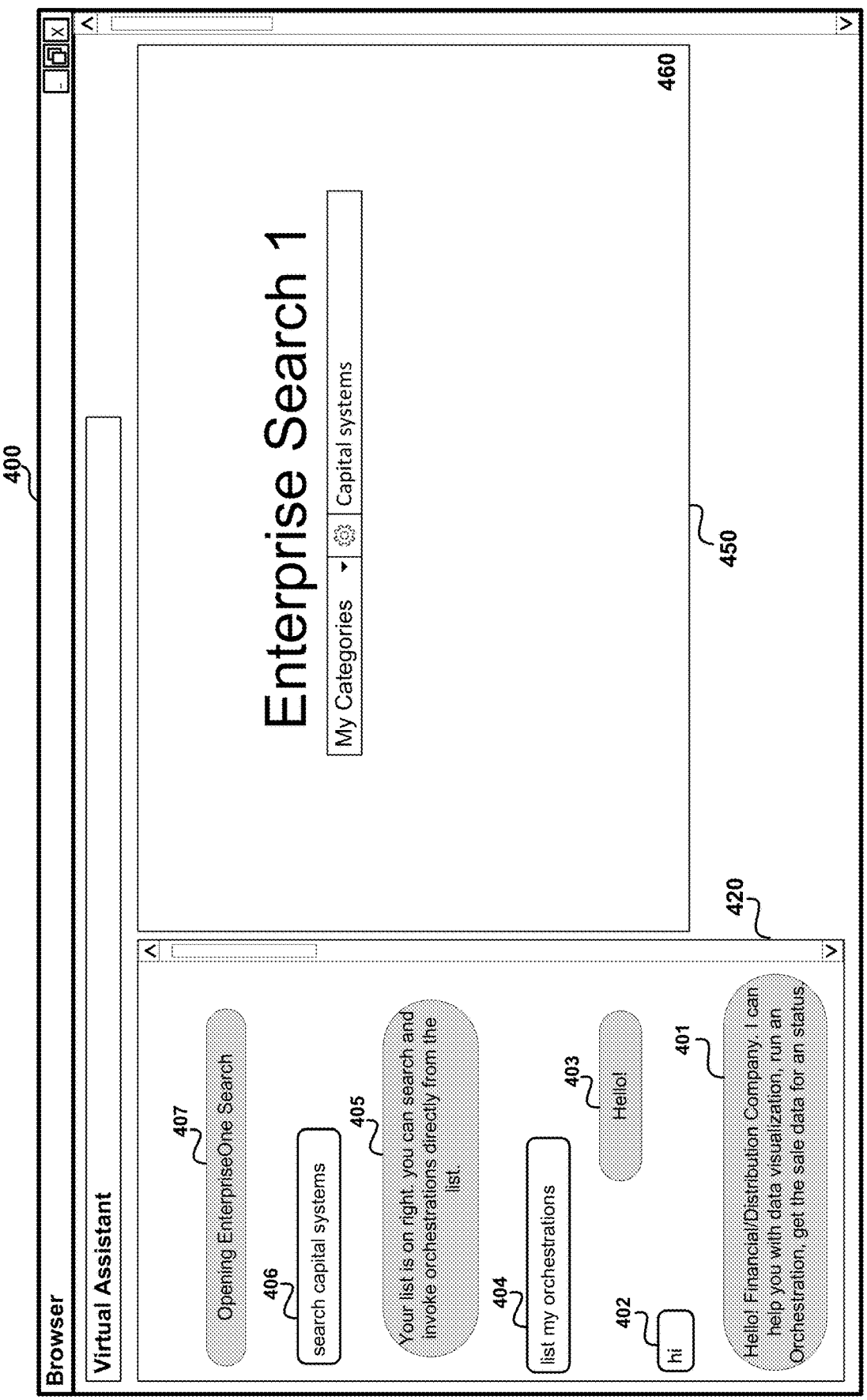

FIGS. 3A-3E and FIGS. 4A-4C depicts sample user interfaces provided by chatbot 150 during a chat conversation with a user in one embodiment. Specifically, FIGS. 3A-3E illustrates the display of data sets responsive to natural language messages, while FIGS. 4A-4C illustrates the display of additional information responsive to natural language messages. Each of the Figures is described in detail below.

Display area 300 (and also display area 400) represents a portion of a user interface displayed on a display unit (not shown) associated with one of client systems 110A-110Z. In one embodiment, display area 300/400 corresponds to a web page rendered by a browser executing on the client system. Web pages are provided by one of server systems 160A-160C in response to a user sending appropriate requests (for example, by specifying corresponding URLs in the address bar) using the browser.

Referring to FIG. 3A, display area 300 depicts a chat interface web page entitled "Virtual Assistant" that is displayed in the browser (executing in client system 110A, for illustration) in response to a user specifying a URL in the browser address bar. It should be noted that chatbot 150 is also downloaded as a part of the chat interface web page. Chatbot 150 is accordingly implemented using browser/client-side supported technologies such as HTML (Hypertext Markup Language), Javascript, jQuery, etc. as will be apparent to one skilled in the relevant arts.

Display area 300 is shown containing chat pane 320 and interactive pane 350. Chat pane 320 represents a portion of the display area for displaying chat conversations between a user and chatbot 150. Interactive pane 350 represents a portion of the display area where interactive widgets that facilitates examination of complex data sets are displayed by chatbot 150.

It may be observed that chat pane 320 is shown containing NL messages 301-307 exchanged between the user and chatbot 150. The NL messages are shown in reverse chronological order in chat pane 320 with the oldest message at the bottom of the pane, and the earliest message at the top of the pane. The odd numbered NL messages (301, 303, 305, etc.) are the messages generated by chatbot 150, while the even numbered NL messages (302, 304, 306, etc.) are the messages received from the user (using appropriate input devices such as keyboard, mouse, etc.).

NL message 304 is a message received from the user to "show me backorders by item". Upon receiving message 304, chatbot 150 determines the pertinent data set as containing the data related to backorders based on a pre-trained neural network, as described above. Chatbot 150 forms the pertinent data set by retrieving the data related backorders by communicating with an application executing on one or more of server systems 160A-160C. The description is continued assuming that chatbot 150 retrieves the backorders data set by interfacing with such an application.

Chatbot 150 then generates and displays NL message 305 to check with the user whether the backorders data set is to be displayed as a chart or as a grid. Upon receiving NL message 306 from the user indicating that the data set is to be displayed as a chart, chatbot 150 constructs an interactive graph widget with the previously formed backorders data set. Chatbot 150 may meanwhile display NL message 307 indicating that the data is currently being fetched and will be displayed in the right/interactive pane (350).

Referring to FIG. 3B, interactive pane 350 is shown displaying interactive graph widget 330 that facilitates the user to examine the backorders by item data set in different views. Interactive graph widget 330 is shown as a response to NL message 306. It may be observed that upon the user moving the mouse pointer (shown as a white hand) over a data value in the backorders data set, additional information (e.g. "Series Gloves-Cloth Value 4000") related to the data value is shown displayed as tool tip 335.

According to an aspect of the present disclosure, interactive graph widget 330 includes a set of filters for selecting a corresponding subset of the backorders data set. A user may select the icon shown in display area 340 to specify a desired subset of filters to be applied on the backorders data set.

Referring to FIG. 3C, interactive pane 350 is shown displaying a set of filters included in interactive graph widget 330. The user may specify any desired subset of filters using the set of filters shown in display area 360. In particular, display area 360 indicates that the user has specified the filter "Next Status" equals "580" to be applied on the backorders data. Upon selecting the tick icon in display area 365, interactive graph widget 330 is shown with the user specified filter applied to the backorders data set.

Referring to FIG. 3D, interactive pane 350 is shown displaying interactive graph widget 330 with the user specified filter "Next Status" equals "580" applied to the backorders data set. The user specified filter is also shown in display area 370 as part of interactive graph widget 330. The user may specify a new desired condition with respect to "Next Status" in display area 370 and click on the refresh icon shown there to cause interactive graph widget 330 to be updated and display the backorders data set with the new condition applied to the data set.

Thus, interactive graph widget 330 facilitates the user to examine the (backorders) data in different views by interacting with the widget (330).

Referring to FIG. 3E, chat pane 320 is shown displaying NL message 308 received from the user indicating that the data set is to be displayed as a grid. Upon receiving NL message 306, chatbot 150 constructs an interactive grid widget (390) with the previously formed backorders data set. Chatbot 150 then displays interactive grid widget 390 in interactive pane 350 as a response to NL message 308.

As such, chatbot 150 facilitates displaying of (complex) data sets responsive to NL messages in a user convenient manner. Chatbot 150 also displays additional information responsive to natural language messages as described below with examples.

Referring to FIG. 4A, display area 400 similar to display area 300 depicts a chat interface web page entitled "Virtual Assistant" that is displayed in the browser, with display area 400 shown containing chat pane 420 and interactive pane 450. Chat pane 420 is shown displaying NL messages 401-405 exchanged between the user and chatbot in reverse chronological order, with the odd numbered NL messages being generated by chatbot 150 and the even numbered NL messages being received from the user.

Upon receiving NL message 304 from the user to "list my orchestration", chatbot 150 forms a data set containing the list of orchestration scripts owned/created by the user. Chatbot 150 then constructs an interactive orchestration list widget 430 and sends it for display. Accordingly, interactive widget 430 is shown displayed in interactive pane 450. Chatbot 150 also displays NL message 405 indicating that the list is displayed in the right/interactive pane (450) and that the user can invoke the orchestrations directly from the list (by interacting with interactive orchestration list widget 430.

Referring to FIG. 4B, interactive pane 350 depicts the manner in which the user is facilitated to invoke a desired orchestration by interacting with interactive orchestration list widget 430. Specifically, the user is shown having selected (shown in bold) the orchestration script named "SS_GetAlphaName", specified the value "4242" for the parameter "AddressBookNo" in display area 440 and selected/clicked the "SUBMIT" button shown there. The output of invocation of the selected orchestration script is shown in display area 445.

Referring to FIG. 4C, chat pane 420 is shown displaying NL message 406 received from the user indicating to "search capital systems". Upon receiving NL message 406, chatbot 150 constructs an interactive application widget (460) that facilitates the user to interact with an enterprise application (here, "Enterprise Search 1"). Chatbot 150 then displays interactive application widget 460 in interactive pane 450 as a response to NL message 406. It may be observed in display area 460 that the specific words to be searched ("capital systems") is shown auto-populated in the search field, thereby facilitating the user to conveniently perform the enterprise search.

Thus, chatbot 150 displays additional information responsive to natural language messages. The manner in which chatbot 150 is implemented in one embodiment is described in detail below.

5. Example Implementation

Figure 5:
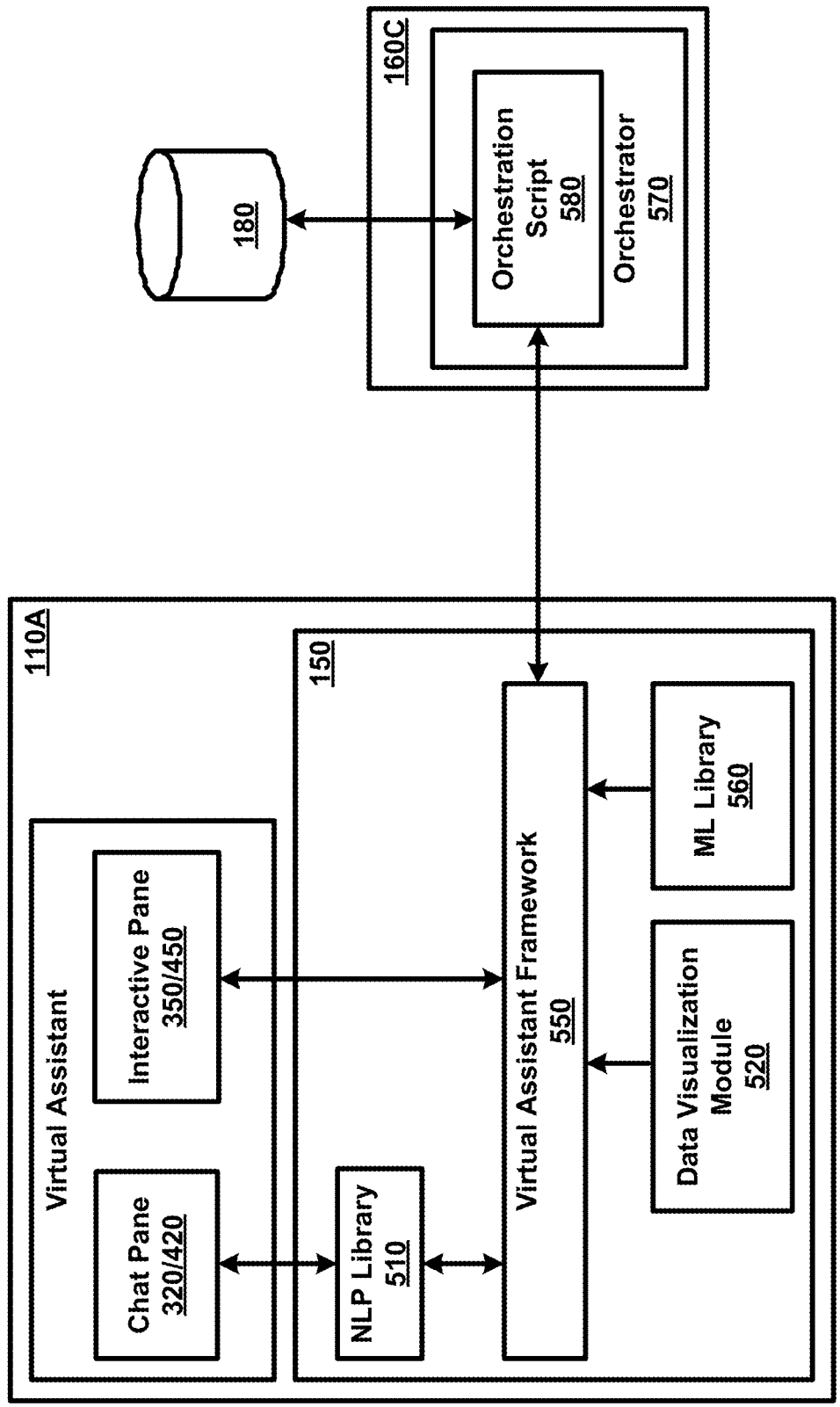
FIG. 5 is a block diagram illustrating a sample implementation of a chatbot provided according to several aspects of the present disclosure.

FIG. 5 is a block diagram illustrating a sample implementation of a chatbot provided according to several aspects of the present disclosure. The block diagram is shown containing natural language processing (NLP) library 510, data visualization module 520, virtual assistant (VA) framework 550, machine learning (ML) library 560, orchestrator 570 and orchestration script 580.

NLP library 510, data visualization module 520, virtual assistant framework 550, and machine ML library 560 are shown executing as part of chatbot 150 in client system 110A, while orchestrator 570 and orchestration script 580 are shown executing as part of server system 160C. However in alternative embodiments, the components may be executed in one or more of client systems 110B-110Z and/or server systems 160A-160B. Each of the blocks is described in detail below.

NLP library 510 provides a natural language (NL) interface with users using chat pane 320/420. Specifically, NLP library 510 receives NL messages from users in the form of text or voice, forwards the received NL messages to virtual assistant framework 550, receives corresponding responses in the form of text, audio, image and video and provides the corresponding responses to the user (in chat pane 320/420). NLP library 510 may be one of third-party libraries such as Dialogflow™, Luis™, Oracle Bot™ cloud service, spaCy, etc., well known in the relevant arts.

VA framework 550 receives the NL messages from NLP library 510 and determines the data set pertinent to each received NL message. In one embodiment, VA framework 550 maintains a Long Short-Term Memory (LSTM) network that maps possible words/symbols in the received NL messages to corresponding pertinent data sets (in particular, to the orchestration scripts designed to retrieve the pertinent data sets). The LSTM/neural network is trained using commonly used/recurring set of 1700+ words.

Upon receiving an NL message from the user (via NLP library 510), VA framework 550 performs the actions of reducing the stopwords (such as am, in, a, the, etc) and lemmatizing (determining the main word such as working, worked=>main word work) and creating a vector indicating the main words. The created vector is then matched with the vectors stored in the LSTM network.

If a match is found in the stored vectors, the corresponding orchestration script mapped to the matching vector is identified. The description is continued assuming that VA framework 550 identifies orchestration script 580 (named "sales_order") as corresponding to the received NL message of "Show me backorders by items". VA framework 550 then invokes the identified orchestration script 580 (with the appropriate parameter values) by communicating with orchestrator 570 executing in server system 160C.

Orchestrator 570 provides an interface to one or more enterprise applications and facilitates inbound and outbound calls to the enterprise applications. Orchestrator 570 additionally facilitates connecting to sensors, external databases, other IOT (Internet of Things) devices, etc. An example of such an orchestrator (570) is JD Edwards EnterpriseOne Orchestrator (available from Oracle Corporation, the assignee of the instant application), which is an integral part of an Internet of things (IoT) configuration with EnterpriseOne and supports integrations with Cloud services, third-party applications, custom programs, etc.

Upon receiving a request to invoke an orchestration script (e.g. 580) from client system 110A (in particular VA framework 550), orchestrator 570 executes the requested orchestration script to cause retrieval (e.g. from data store 180) of the data set pertinent to the NL message received from the user. For the NL message "Show me backorders by items", orchestrator 570 executes the requested/invoked orchestration script 580 named "sales_order" to cause retrieval of data related to backorders by item as the pertinent data set. Orchestrator 570 the forwards the retrieved data set to the requesting client system 110A (in particular VA framework 550).

VA framework 550 upon receiving the pertinent (backorders) data set from server systems 160C, forwards the received data set to data visualization module 520 which in turn constructs an interactive widget based on the received data set. As noted above, the interactive widget is constructed to facilitate the user to examine the pertinent (backorders) data set in different views (as described above with respect to FIGS. 3B-3D). In one embodiment, the interactive widgets are constructed using visualization libraries such as Oracle JavaScript Extension Toolkit (JET) available from Oracle Corporation. As is well known, Oracle JET provides a modular open source toolkit based on modern JavaScript, CSS3 and HTML5 design and development principles.

Data visualization module 520 then forwards the constructed interactive widget (such as 330 of FIG. 3B) to VA framework 550 which in turn sends the interactive widget for display in the user interface. As described above, in one embodiment, the constructed interactive widget is thereafter displayed in interactive pane 350/450.

ML Library 560 provides the ability to "learn" (i.e., progressively improve performance on a specific task) with data, without being explicitly programmed using statistical techniques. Such "learning" typically entails using techniques such as pattern recognition as is well known in the arts. In one embodiment, VA framework 550 forwards the pertinent data set to ML library 560 as well (in addition to forwarding to data visualization module 520) to facilitate ML library 560 to identify additional information/desired patterns from the data set. The identified information is then sent by ML Library 560 to VA framework 550 which in turn may forward the additional information to data visualization module 520 for possible inclusion in the interactive widget. ML library 560 may be a third-party library such as Scikit-learn.

It should be appreciated that the features described above can be implemented in various embodiments as a desired combination of one or more of hardware, software, and firmware. The description is continued with respect to an embodiment in which various features are operative when the software instructions described above are executed.

6. Digital Processing System

Figure 6:
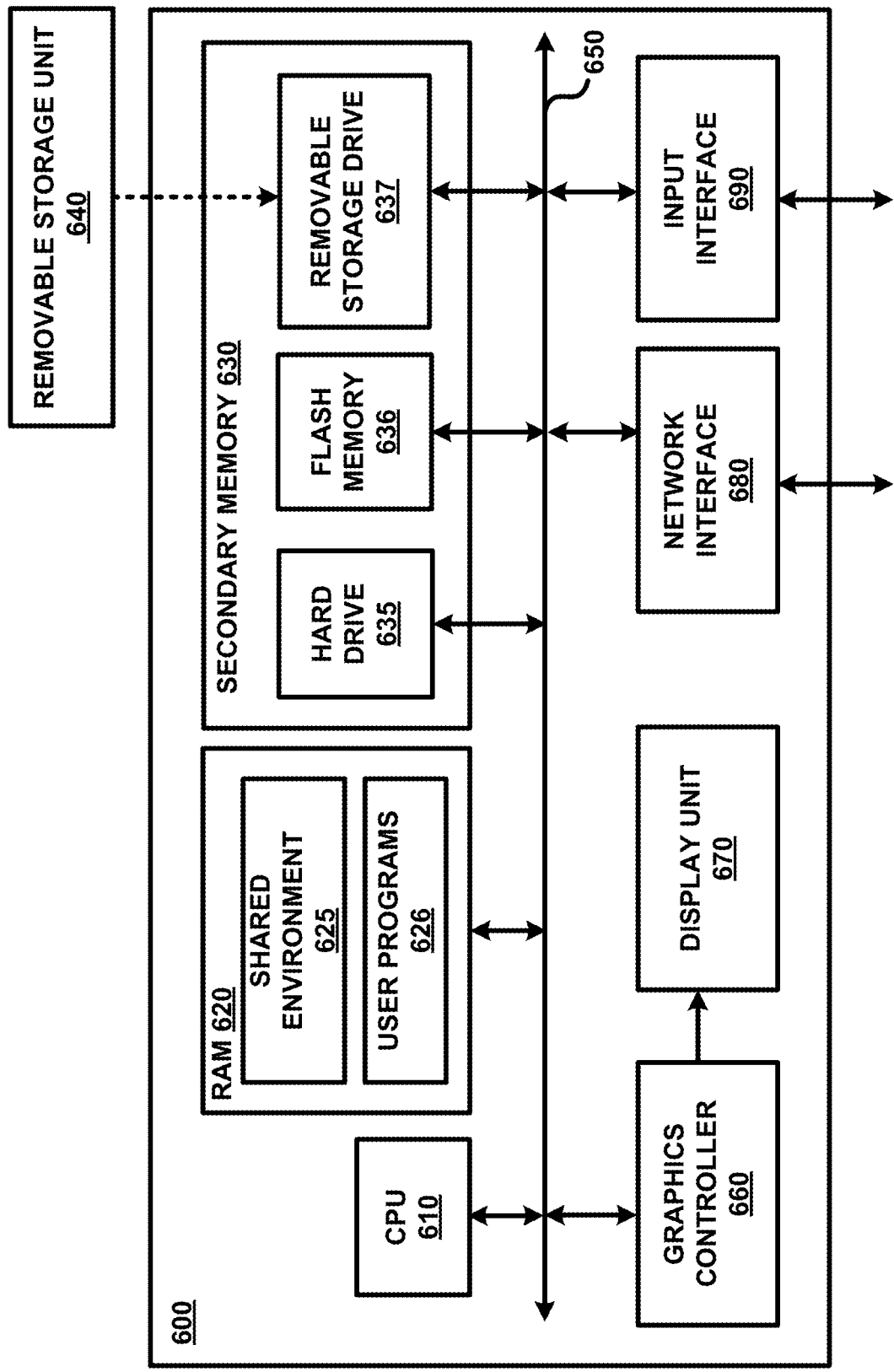
FIG. 6 is a block diagram illustrating the details of a digital processing system in which various aspects of the present disclosure are operative by execution of appropriate executable modules.

FIG. 6 is a block diagram illustrating the details of digital processing system 600 in which various aspects of the present disclosure are operative by execution of appropriate executable modules. Digital processing system 600 may correspond to any system (such as client systems 110A-110C or server systems 160A-160C) executing chatbot 150.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or other user programs 626 (such as other applications, DBMS, etc.). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals (for example, the portions of the user interfaces shown in FIGS. 3A-3E and 4A-4C). Input interface 690 may correspond to a keyboard and a pointing device (e.g., touch-pad, mouse) and may be used to provide inputs (for example, the inputs associated with the user interfaces shown in FIGS. 3A-3E and 4A-4C). Network interface 680 provides connectivity to a network (e.g., using Internet Protocol), and may be used to communicate with other systems (of FIG. 1) connected to the networks (120 and 140).

Secondary memory 630 may contain hard drive 635, flash memory 636, and removable storage drive 637. Secondary memory 630 may store the data (for example, pertinent data sets, etc.) and software instructions (for example, for implementing the various features of the present disclosure as shown in FIG. 2, etc.), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of processing natural language (NL) messages in a server system, said method comprising:
receiving a first NL message on a chat conversation from a user of a client system, wherein said first NL message is part of said chat conversation in which said user interacts with said chatbot in the form of text constituting NL messages;
forming a first data set pertinent for responding to said first NL message;
constructing a first interactive widget that facilitates examination of said first data set in different views; and
sending said first dataset and said first interactive widget to said client system as a response to said first NL message,
wherein said client system implements a chatbot providing for said conversation and is further operable to:
receive said first data set and said first interactive widget from said server system; and
display said first data set using said first interactive widget on a display screen,
after said first data set is displayed using said first interactive widget on said display screen, said user is facilitated to interact with said first interactive widget and provide a plurality of user inputs to said first interactive widget,
wherein said first interactive widget, in response to each user input of said plurality of user inputs, displays said same first data set in a corresponding view of a plurality of different views without said client system having to receive said first data set again from said server system.

2. The method of claim 1, wherein said chat conversation is displayed in a first display area of said display screen and said first interactive widget is displayed in a second display area of said display screen, wherein said second display area is embedded in said first display area.

3. The method of claim 1, further comprising sending for display on said display screen an user interface comprising a chat pane and an interactive pane, wherein said chat conversation is displayed in said chat pane and said first interactive widget is displayed in said interactive pane.

4. The method of claim 3, wherein said chat pane and said interactive pane are displayed in a display unit in non-overlapping display areas.

5. The method of claim 1, wherein said first interactive widget includes a set of filters, wherein said user interacts with said first interactive widget by specifying one or more of said set of filters as one user input of said plurality of user inputs to view said same first data set in one corresponding view of said plurality of different views.

6. The method of claim 1, wherein said server system comprises an orchestration server maintaining a plurality of orchestration scripts, said communicating comprises sending an identifier of an orchestration script of said plurality of orchestration scripts and parameter values for said orchestration script,
wherein said orchestration server determines said first data set by executing said orchestration script with said parameter values.

7. The method of claim 6, further comprising:
receiving a second NL message from said user;
constructing a second interactive widget containing a listing of said plurality of orchestration scripts;
sending for display said second interactive widget in response to said second NL message;
receiving via said second interactive widget from said user, a second identifier of a second orchestration script of said plurality of orchestration scripts and corresponding parameter values for said second orchestration script; and
providing via said second interactive widget a second data set retrieved by execution of said second orchestration script.

8. A non-transitory machine readable medium storing one or more sequences of instructions for processing natural language (NL) messages, wherein execution of said one or more instructions by one or more processors contained in a server system causes said server system to perform the actions of:
receiving a first NL message on a chat conversation from a user of a client system, wherein said first NL message is part of said chat conversation in which said user interacts with said chatbot in the form of text constituting NL messages;
forming a first data set pertinent for responding to said first NL message;

constructing a first interactive widget that facilitates examination of said first data set in different views;

sending said first dataset and said first interactive widget to said client system as a response to said first NL message, wherein said client system implements a chatbot providing for said conversation and is further operable to:

receive said first data set and said first interactive widget from said server system; and display said first data set using said first interactive widget on a display screen, after said first interactive widget is displayed on said display screen, said user is facilitated to interact with said first interactive widget and provide a plurality of user inputs to said first interactive widget, wherein said first interactive widget, in response to each user input of said plurality of user inputs displays said same first data set in a corresponding view of a plurality of different views.

9. The non-transitory machine readable medium of claim 8, wherein said chat conversation is displayed in a first display area of said display screen and said first interactive widget is displayed in a second display area of said display screen, wherein said second display area is embedded in said first display area.

10. The non-transitory machine readable medium of claim 8, further comprising one or more instructions for sending for display on said display screen an user interface comprising a chat pane and an interactive pane, wherein said chat conversation is displayed in said chat pane and said first interactive widget is displayed in said interactive pane.

11. The non-transitory machine readable medium of claim 10, wherein said chat pane and said interactive pane are displayed in a display unit in non-overlapping display areas.

12. The non-transitory machine readable medium of claim 8, wherein said first interactive widget includes a set of filters, wherein said user interacts with said first interactive widget by specifying one or more of said set of filters as one user input of said plurality of user inputs to view said same first data set in one corresponding view of said plurality of different views.

13. A server system comprising:

one or more processors; and a random access memory (RAM) to store instructions, wherein said one or more processors retrieve said instructions and execute said instructions, wherein execution of said instructions causes said server system to perform the actions of:

receiving a first NL message on a chat conversation from a user of a client system, wherein said first NL message is part of said chat conversation in which said user interacts with said chatbot in the form of text constituting NL messages;

forming a first data set pertinent for responding to said first NL message;

constructing a first interactive widget that facilitates examination of said first data set in different views;

sending said first dataset and said first interactive widget to said client system as a response to said first NL message, wherein said client system implements a chatbot providing for said conversation and is further operable to:

receive said first data set and said first interactive widget from said server system; and display said first data set using said first interactive widget on a display screen at a first time instance, after said first interactive widget is displayed on said display screen at said first time instance, said user is facilitated to interact with said first interactive widget and provide a plurality of user inputs to said first interactive widget, wherein said first interactive widget, in response to each user input of said plurality of user inputs displays said same first data set in a corresponding view of a plurality of different views, wherein said plurality of different views includes a chart and a grid, wherein said first interactive widget displays said same first data set as one of said chart and said grid at said first time instance, wherein said plurality of user inputs includes a first user input at a second time instance to change to the other of said chart and said grid, wherein said second time instance is after said first time instance, wherein said first interactive widget, in response to said first user input at said second time instance, displays said same first data set in the other of said chart and said grid.

14. The server system of claim 13, wherein said chat conversation is displayed in a first display area of said display screen and said first interactive widget is displayed in a second display area of said display screen, wherein said second display area is embedded in said first display area.

15. The server system of claim 13, further performing the actions of sending for display on said display screen an user interface comprising a chat pane and an interactive pane, wherein said chat conversation is displayed in said chat pane and said first interactive widget is displayed in said interactive pane, wherein said chat pane and said interactive pane are displayed in a display unit in non-overlapping display areas.

16. The server system of claim 13, wherein said first interactive widget includes a set of filters, wherein said user interacts with said first interactive widget by specifying one or more of said set of filters as one user input of said plurality of user inputs to view said same first data set in one corresponding view of said plurality of different views.

17. The server system of claim 13, wherein said server system comprises an orchestration server maintaining a plurality of orchestration scripts, said communicating comprises sending an identifier of an orchestration script of said plurality of orchestration scripts and parameter values for said orchestration script, wherein said orchestration server determines said first data set by executing said orchestration script with said parameter values.

18. The non-transitory machine readable medium of claim 13, wherein said server system comprises an orchestration server maintaining a plurality of orchestration scripts, said communicating comprises sending an identifier of an orchestration script of said plurality of orchestration scripts and parameter values for said orchestration script, wherein said orchestration server determines said first data set by executing said orchestration script with said parameter values.

19. The non-transitory machine readable medium of claim 18, further comprising:

receiving a second NL message from said user;

constructing a second interactive widget containing a listing of said plurality of orchestration scripts;

sending for display said second interactive widget in response to said second NL message;

receiving via said second interactive widget from said user, a second identifier of a second orchestration script of said plurality of orchestration scripts and corresponding parameter values for said second orchestration script; and providing via said second interactive widget a second data set retrieved by execution of said second orchestration script.

20. The non-transitory machine readable medium of claim 8, wherein said first interactive widget displays said same first data set in said corresponding view without said client system having to receive said first data set again from said server system after said display.

21. The server system of claim 13, wherein said first interactive widget displays said same first data set in said corresponding view without said client system having to receive said first data set again from said server system after said display.

22. The server system of claim 13, wherein the first user input is in the form of a third NL message received from said user on said chat conversation.

* * * * *